Sept. 4, 1923.
G. C. HANLEY
SHUT-OFF COCK
Filed May 2, 1921
1,466,828
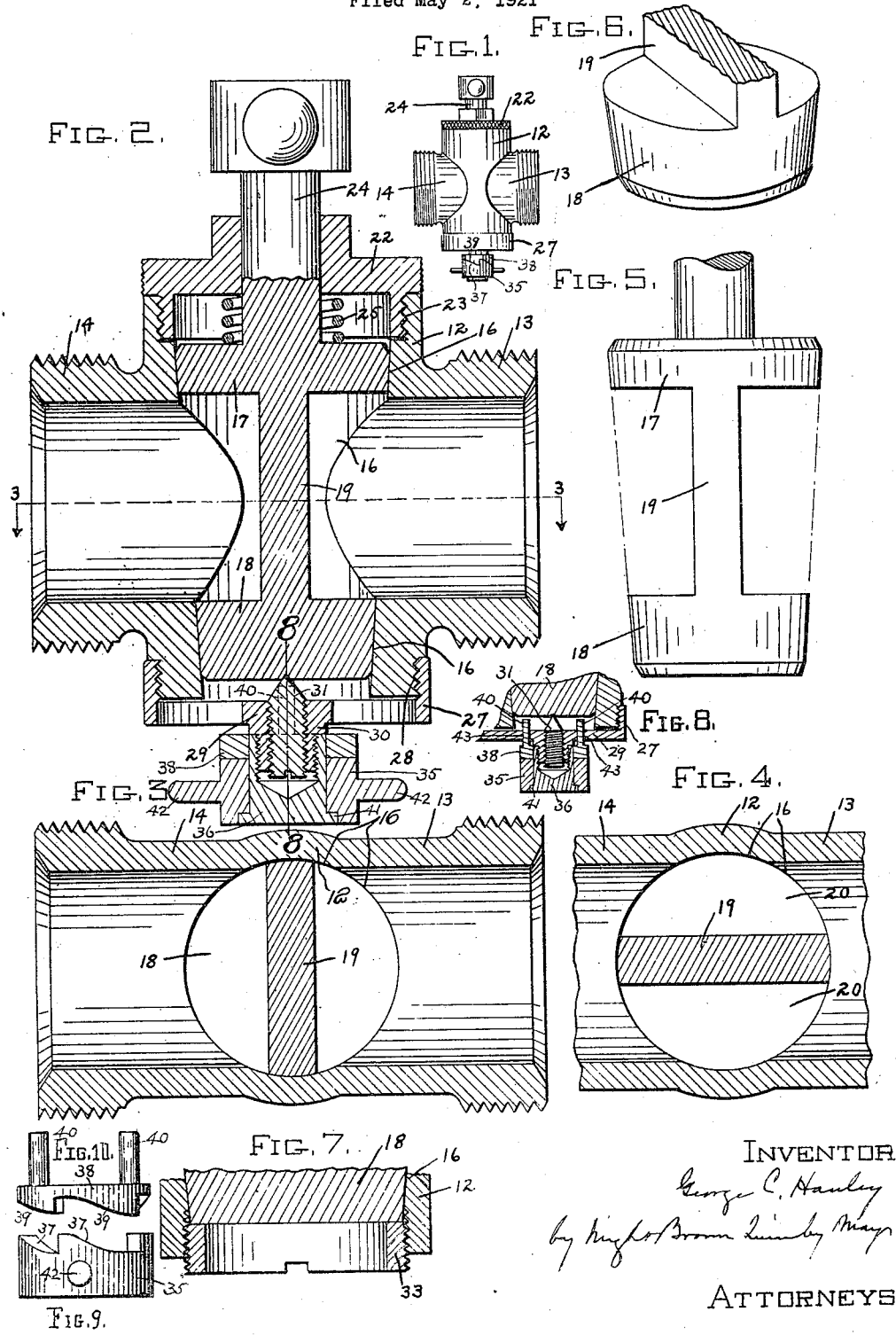
INVENTOR
George C. Hanley
by Hughes Brown Lumby Mayo
ATTORNEYS Patented Sept. 4, 1923.

1,466,828

UNITED STATES PATENT OFFICE.

GEORGE C. HANLEY, OF MALDEN, MASSACHUSETTS.

SHUT-OFF COCK.

Application filed May 2, 1921. Serial No. 465,985.

To all whom it may concern:

Be it known that I, GEORGE C. HANLEY, a citizen of the United States, residing at Malden, in the county of Middlesex and State of Massachusetts, have invented new and useful Improvements in Shut-Off Cocks, of which the following is a specification.

This invention relates to a shut-off cock comprising a casing provided with a conical valve-seat and with alined inlet and outlet conduits at opposite sides of and intersecting said seat, and a conical plug valve adapted to turn in said seat, and formed to connect said conduits when opened, and shut off communication between the conduits when closed.

It is customary to provide a cock of this character with a spring, adapted to press the conical valve against the conical seat in such manner as to compensate for wear, and maintain a tight joint. It sometimes happens that the spring pressure causes such friction that it is difficult to turn the valve.

One object of the invention is to provide means for regulating spring pressure of the tapered valve on its seat, so that said pressure may be slightly decreased when found to be excessive.

Another object is to provide an improved construction of the casing facilitating the removal of the valve from the casing and the operation of cleaning out the casing when the valve is removed.

Another object is to provide an improved form of valve whereby a maximum volume of fluid is permitted to flow through the cock without rendering the cock objectionably heavy and expensive.

To these ends the invention consists in the improvements which I will now proceed to describe and claim.

Of the accompanying drawings forming a part of this specification,—

Figure 1 is a side view on a reduced scale, of a cock embodying the invention.

Figure 2 is a longitudinal section of the same, the valve being closed.

Figure 3 is a section on line 3—3 of Figure 2.

Figure 4 is a fragmentary view similar to portions of Figure 3, showing the valve open.

Figure 5 is an elevation of the valve.

Figure 6 is a fragmentary perspective view of a portion of the valve.

Figure 7 is a fragmentary sectional view, showing a variation of the abutment hereinafter described.

Figure 8 is a reduced fragmentary section on line 8—8 of Figure 2.

Figures 9 and 10 are side views of the cam sleeve and of the ring hereinafter described.

The same reference characters indicate the same parts in all of the figures. The word "conical" as used herein, is to be understood as meaning frusto-conical.

In the drawings, 12 represents the body of the cock casing, 13 and 14 represent respectively, an inlet and an outlet conduit, said conduits being at opposite sides of the body, and alined with each other. The body is provided with an internal valve-seat 16, which is intersected by the bores of the conduits, and is formed to conform accurately to the periphery of a conical plug valve, adapted to turn in the valve-seat, and so formed that when turned to an open position, it connects the conduits 13 and 14, and when turned about ninety degrees from said position, it shuts off communication between the said conduits.

Although the valve may be of any suitable construction enabling it to cooperate with the casing as above stated, the preferred construction is as next described. The valve has the form of a conical plug, which is flattened and recessed between its ends, so that the valve has two conical tapered end portions 17 and 18, fitting the end portions of the valve-seat at opposite sides of the conduits 13 and 14, and an intermediate gate portion 19, having side faces which form surfaces of two fluid passages 20, as shown by Figure 4, when the valve is open, and relatively narrow oppositely inclined edge faces which contact with the valve-seat portions between the conduits, as shown by Figure 3, when the valve is closed. The internal diameter of the conduits 13 and 14 is slightly less than the mean diameter of the valve-seat and valve, that is to say, the diameter of the seat and valve midway between their larger and their smaller ends. Provision is thus made for forming passages 20 of maximum width when the valve is open, as shown by Figure 4.

The described construction of the valve and casing enables a larger volume of fluid to flow through the cock than would be possible if the valve were provided with a single passage or bore extending through it from side to side, and intersecting its axis, unless the bulk of the valve and casing were so increased as to render the cock undesirably heavy and expensive. The casing body 12 is provided at its larger end with a detachable head or bonnet 22, preferably secured by a screw-thread connection at 23, and having an orifice through which the stem 24 of the valve passes. Between the head 22 and the larger end of the valve is interposed a spring 25, adapted to press the conical periphery of the valve against the conical seat, and thus maintain a tight joint and compensate for wear.

To decrease the pressure of the valve against the seat, in case frictional resistance to the turning of the valve is found to be excessive, I provide at the smaller end of the casing-body an adjustable abutment, adapted to contact with the smaller end of the valve, and slightly move the latter endwise to decrease the pressure of its periphery on the valve-seat, the abutment being movable lengthwise of the valve-seat, or in the direction of the axis of the valve.

Figures 2 and 8 show an abutment 31 supported by a ring 27, having a screw-thread connection at 28 with the open end of the casing body, and a cross-bar 29 extending across the ring, and provided with a boss 30 having a tapped orifice, the abutment being pointed screw 31, coaxial with the valve and adapted to bear on the smaller end of the latter. The abutment may be adjusted by turning the ring 27 or the screw 31, or both, to regulate the pressure of the valve on its seat.

The lower end of the casing body is open, so that a clean-out opening is provided when the valve is removed, permitting the convenient and thorough cleansing of the internal surfaces of the casing. The abutment does not close said opening, and permits cleansing liquid to flow to or from the casing, so that the casing may be cleansed without removing the abutment. The screw-thread connection 28 permits the removal of the abutment, and an entirely unobstructed flow through the clean-out opening. A simpler form of abutment is shown by Figure 7, this being embodied in an externally threaded ring 33, engaged with an internal thread in the casing, and adapted to bear on the marginal portion of the smaller end of the valve.

When the cock is used to control the flow of certain liquids, such as milk, films or coatings are deposited on the surfaces of the cock and valve with which the liquid contacts. These films often cause an adhesion of the valve to the casing, rendering it difficult to open the valve after the latter has remained closed for a considerable time. To enable this adhesion to be quickly and conveniently broken, I provide a valve presser independent of the abutment, and means supporting the same in the open end of the casing, said presser being movable to slightly raise the valve from its seat, and thus break an adhesion, and to release the valve and permit the spring to seat it.

As here shown, said presser includes a ring 38, having cam faces 39, and fingers 40 projecting from the ring, and arranged to bear on the smaller end of the valve. The ring 38 is supported by a cam sleeve 35, having cam faces 37, complemental to the faces 39 of the presser ring. The cam sleeve 35 is rotatable on a fixed stud 36, which is recessed and internally threaded at one end and engaged with an externally threaded portion of the boss 30, as shown by Figures 2 and 8. The cam sleeve is supported by a shoulder 41 on the stud, and is provided with handles 42, by which it may be manually rotated. The presser ring 38 is adapted to slide up and down on the stud 36, and its fingers 40 are movable vertically in orifices 43 (Figure 8) in the cross-bar 29, the ring 38 being prevented by the engagement of the fingers with the orifices 43 from rotating with the cam sleeve 35. When the cam faces 37 and 39 register as shown by Figure 1, the fingers 40 are depressed and separated from the valve. When the cam sleeve 35 is turned clockwise, its cam faces 37 act on the cam faces 39 to raise the presser formed by the ring 38 and fingers 40, and press said fingers against the smaller end of the valve, thus lifting the latter slightly from its seat. When the sleeve 35 is turned far enough to release the cam faces 39, the ring 38 and fingers 40 drop, and the valve is forced by the spring 25 against the seat. The stud 36 is detachable from the boss 30 to expose and permit the adjustment of the abutment screw 31.

I claim:

1. A shut-off cock comprising a casing having a conical internal valve-seat, alined inlet and outlet conduits intersecting the valve-seat, a head detachably secured to the casing at the larger end of the valve-seat, an abutment adjustably secured to the casing at the smaller end of the valve-seat, the abutment being adjustable lengthwise of the valve-seat, a conical plug-valve fitted to turn in said seat, and formed to connect said inlet and outlet conduits when opened, the smaller end of the valve being arranged to contact with said abutment, and a spring interposed between said head and the larger end of the valve, and adapted to yieldingly press the valve endwise against the seat, and toward the abutment, the casing having a clean-out opening at the smaller end of the valve-seat, and the abutment being formed to permit the passage of liquid through said opening when the valve is removed.

2. A shut-off cock comprising a casing having a conical internal valve seat, an opening at the smaller end of said seat, alined inlet and outlet conduits intersecting the valve seat, a head at the larger end of the valve seat, a conical cylindrical plug valve fitted to turn in said seat, and formed to connect said inlet and outlet conduits when opened, a spring interposed between said head and the larger end and adapted to yieldingly press the valve endwise against the seat, an internally threaded ring engaged with the casing and having a cross-bar extending across said opening, said cross-bar having an internally threaded boss, and an abutment screw adjustably engaged with said boss, and bearing on the smaller end of the valve to regulate the pressure of the valve against the seat.

3. A shut-off cock comprising a casing having a conical internal valve seat, an opening at the smaller end of said seat, alined inlet and outlet conduits intersecting the valve seat, a head at the larger end of the valve seat, a conical plug valve fitted to turn in said seat, and formed to connect said inlet and outlet conduits when opened, a spring interposed between said head and the larger end and adapted to yieldingly press the valve endwise against the seat, an internally threaded ring engaged with the casing and having a cross-bar extending across said opening, said cross-bar having an internally threaded boss, an abutment screw adjustably engaged with said boss, and bearing on the smaller end of the valve to regulate the pressure of the valve against the seat, a stud detachably engaged with said boss and covering the outer end of the abutment screw, a cam sleeve supported by and rotatable on said stud, and a valve presser interposed between said sleeve and the smaller end of the valve and adapted to be alternately raised and released by rotation of the cam sleeve, to alternately lift and release the valve.

4. A shut-off cock comprising a casing having a conical internal valve-seat, alined inlet and outlet conduits intersecting the valve-seat, a head detachably secured to the casing at the larger end of the valve-seat, an abutment adjustably secured to the casing at the smaller end of the valve-seat, the abutment being adjustable lengthwise of the valve-seat, a conical plug valve fitted to turn in said seat, and formed to connect said inlet and outlet conduits when opened, the smaller end of the valve being arranged to contact with said abutment, and a spring interposed between said head and the larger end of the valve, and adapted to yieldingly press the valve endwise against the seat, and toward the abutment, the said casing being provided with manually operable means independent of the abutment for lifting the valve from its seat.

5. A shut-off cock comprising a casing having a conical internal valve-seat, alined inlet and outlet conduits intersecting the valve-seat, a head detachaby secured to the casing at the larger end of the valve-seat, an abutment adjustably secured to the casing at the smaller end of the valve-seat, the abutment being adjustable lengthwise of the valve-seat, a conical plug valve fitted to turn in said seat, and formed to connect said inlet and outlet conduits when opened, the smaller end of the valve being arranged to contact with said abutment, and a spring interposed between said head and the larger end of the valve, and adapted to yieldingly press the valve endwise against the seat, and toward the abutment, the said casing being provided with valve-lifting means independent of the abutment, and including a stud fixed to the casing, a cam sleeve rotatable on the stud, and a non-rotating ring adapted to be alternately raised and released by the cam sleeve, and provided with fingers which contact with and lift the valve when the ring is raised.

In testimony whereof I have affixed my signature.

GEORGE C. HANLEY.